(12) United States Patent
Pulnikov

(10) Patent No.: US 9,108,366 B2
(45) Date of Patent: Aug. 18, 2015

(54) METHOD OF MANUFACTURING AND STRUCTURE OF PRESTRESSED COMPOSITE REINFORCEMENTS

(71) Applicant: Andrey Pulnikov, Villingen-Schwenningen (DE)

(72) Inventor: Andrey Pulnikov, Villingen-Schwenningen (DE)

(73) Assignee: Andrey Pulnikov, Villingen-Schwenningen (DE)

( * ) Notice: Subject to any disclaimer, the term of this patent is extended or adjusted under 35 U.S.C. 154(b) by 252 days.

(21) Appl. No.: 13/857,394

(22) Filed: Apr. 5, 2013

(65) Prior Publication Data

US 2014/0299259 A1    Oct. 9, 2014

(51) Int. Cl.
*B29C 70/56*    (2006.01)

(52) U.S. Cl.
CPC ..................................... *B29C 70/56* (2013.01)

(58) Field of Classification Search
CPC .. B29C 70/56; B29C 53/582; B29C 47/0023; B29C 53/8016; B29C 63/10; B29C 53/566; B29C 70/50; B29C 63/00; B29C 2053/8025; B29C 53/845; B29C 65/4815; B29C 69/002; B29C 70/521; B29C 47/0026; B29C 53/56; B29C 53/68
USPC ......... 156/162, 171, 160, 163, 169, 176, 184, 156/187, 195, 166, 172; 42/76.1, 76.01, 42/76.02; 242/365.7, 438; 124/8
See application file for complete search history.

(56) References Cited

U.S. PATENT DOCUMENTS 6,350,204 B1 *    2/2002    Yasui et al. ................... 464/181

* cited by examiner

*Primary Examiner* — Jacob T Minskey
*Assistant Examiner* — Vishal I Patel

(57) ABSTRACT

In this invention a method of manufacturing and structure of prestressed composite reinforcements for cylindrical liners is presented. The method relies on creating deep precompression in the liner compensated by according pretension in the reinforcement. This method allows efficient use of mechanical properties of material of the liner and reinforcement and can provide a substantial mass reduction of the overall component.

27 Claims, 10 Drawing Sheets

METHOD OF MANUFACTURING AND STRUCTURE OF PRESTRESSED COMPOSITE REINFORCEMENTS

TECHNICAL FIELD

This invention is related to composite reinforcement bandages. The technique proposed in this invention could be useful for components subjected to internal pressure or high centrifugal loads.

BACKGROUND INFORMATION

This invention is related to fiber reinforced bandages and containment solutions for high-speed applications as well as for devices and components operating at high internal pressure. This invention is particularly useful when a light weight solution is necessary.

The purpose of this invention is to provide reinforcement of cylindrically shaped components with the goal of substantial mass reduction, reliable operation under load and in the whole operational temperature range. Another purpose of this invention is to facilitate manufacturing of such a reinforcement.

Alternative reinforcement approaches presented in literature and other inventions do not allow achieving the specified combination of these goals.

In U.S. Pat. No. 4,401,729 a ceramic tube precompressed by a steel sleeve is proposed. This approach has a number of disadvantages, such as inconsistency of thermomechanical properties of the sleeve and the base tube, leading to reduction of precompression of the ceramic liner at elevated temperatures. This approach imposes very tight restrictions on the accuracy of both the sleeve and the liner. Tension in the steel sleeve is non-uniform, which means that the sleeve material is not used fully. Since steel is a heavy material, there is no overall mass reduction.

In U.S. Pat. No. 5,125,179 a ceramic tube precompressed by a braided carbon fiber sleeve is proposed. The braided sleeve is kept under pretension during curing, which assures mechanical contact between the sleeve and the liner after the curing. The braided structure would not permit high levels of precompression in the liner due to considerable deflection of fibers from the hoop direction. It is well-known that stiffness of composites drops if there is a deviation between the load direction and direction of fibers. Besides, loading fibers before the polymer is cured would not allow achieving substantial levels of pretension. Fibers contain various defects along their length and these defects generally determine the strength of fibers and eventually of the whole bundle. However when the bundle is impregnated with a polymer matrix and the polymer matrix is fully cured, the load becomes distributed between fibers. Since defects are randomly spread over the length of the fiber, the effect of the defects is greatly diminished. This leads to a considerable increase in strength. The mechanical properties of composite materials are therefore greatly affected by the state of the matrix. In U.S. Pat. No. 5,125,179 the pretension is suggested to be applied before the composite has reached its full strength. This leads to low pretension and inefficient use of the reinforcement as well as incomplete use of the properties of the ceramic liner. So weight reduction would be fairly small.

In U.S. Pat. No. 5,915,937 a premade reinforcing carbon fiber composite bandage with a thermoset matrix is suggested to be slid over a metal liner. This approach is also fairly inefficient at least in providing radial reinforcement, because metal and composite have different elastic limits. High strength carbon fiber composites have maximal deformation up to 1.5% or even higher, while elastic limit, for instance, for steels is typically assumed to be 0.2%. During operation both the liner and the bandage being in contact would essentially share the same deformation. Obviously, only a small fraction of the strength of the bandage would be employed. Low specific contribution of the reinforcement could be compensated by its increased thickness. This would increase the cost, impede cooling of the liner during firing and increase the total weight of the component. The overall mass reduction in this case is unsubstantial.

In a publication "Optimal Design of Cylindrical Steel/Composite Hybrid Structures for Gun Barrel Applications" of John Tierney et al. presented at SAMPE Sym. in 2005, a wet-wound epoxy-based pretensioned carbon fiber reinforcement is suggested for a steel liner. Since pretension is applied at an inappropriate moment, when the strength of the composite is fairly low, the applied pretension is also low and the use of the material of reinforcement is inefficient.

In a publication "Prestressed Carbon Fiber Composite Overwrapped Gun Tube" of A. Littlefield and E. Hyland, November 2006 currently accessible on http://www.dtic.mil/ a carbon fiber with a polyetheretherketone (PEEK) matrix is suggested for the reinforcement of the steel barrel. The carbon fiber tow comes already preimpregnated with the matrix by the supplier. Such tows are typically referred as prepregs. As mentioned in this publication the selected material allows curing in place by effectively welding the prepreg tow to the wound laminate. The process utilized a hot-gas torch and a pressure roller in order to consolidate the prepreg. Winding was performed under tension. However since the matrix was melt, the pretension applied to the tow was low compared to the tension that could be applied to the dry tow. This happens because the fibers get some freedom when matrix is melt leading to increased effect of fiber defects and overall reduction of the strength of the tow. Since pretension was relatively low, the overall mass reduction was moderate.

Thus the most common mistake made in alternative approaches is that the properties of the composite reinforcement and the liner are not used fully. The pretension is typically applied to the composite before the composite has reached its full strength. In this respect even a conventional cold-drawn steel wire would have provided a superior level of specific pretension despite its higher density. A composite tow subjected to pretension in the right moment when its strength is maximal, would have allowed even higher overall weight reduction.

SUMMARY OF INVENTION

Modern high-strength materials, such as fiber reinforced composites and metal wires, typically have a much larger deformation range compared to the deformation range of the liner. Introduction of pretension into the reinforcement and according precompression of the liner can help balance deformation ranges of two materials. Thereby a complete use of mechanical properties of both the liner and reinforcement could be reached, which would enable substantial mass reduction.

The maximum weight reduction could be achieved if fiber-reinforced composites are used, because these materials generally have superior strength and low density. However it is important to apply pretension when the composite has achieved its full strength. In case of a polymer matrix, this situation is reached when the polymer is fully cured. The composite tow should have sufficient number of fibers in order to reduce effect of defects spread along the length of fibers. When the composite has its full strength, winding under pretension could be implemented.

Prior to winding, some preliminary manufacturing steps could be conducted in order to enable application of the required torque to the liner and secure sides of wound layers.

Winding under pretension is carried out in a similar way both for the composite tows and for the metal wires. The winding process is carried out in the following steps: fixation of the tow or wire; winding under pretension with optional fixation of layers; fixation of the tow or wire upon completion of the winding.

An extra protection layer could be optionally applied on top of the wound reinforcement bandage.

In a few examples specific implementations of each of the described technological steps will be provided. Apart from direct winding a novel way of introducing pretension into the reinforcement bandage is proposed.

DETAILED DESCRIPTION

If a cylindrical part is subjected to internal pressure or centrifugal loads, it is in most cases sufficient to provide radial reinforcement. This reinforcement could be implemented by direct winding under pretension using fiber reinforced tape. The type of the matrix is irrelevant as long as it satisfies the requirement of distributing the load among the fibers. All available matrix materials would generally be usable with a preference to thermoset, thermoplast polymer matrices and metal matrices. So either a fully cured thermoset fiber reinforced tape or tow, or a fiber reinforced thermoplast matrix tape or tow, or a fiber reinforced metal matrix tape or tow or any combination of such tapes or tows would be usable. As mentioned above, drawn steel wires or generally metal wires could also be suitable candidates for the reinforcement, if, for instance, application requires minimization of costs rather than minimization of weight, because steel wires are cheaper compared to pultruded composite tows or rods. However the proposed manufacturing approach would remain practically the same. Pultruded composite tows or rods are manufactured by a pultrusion process.

Figure 1:
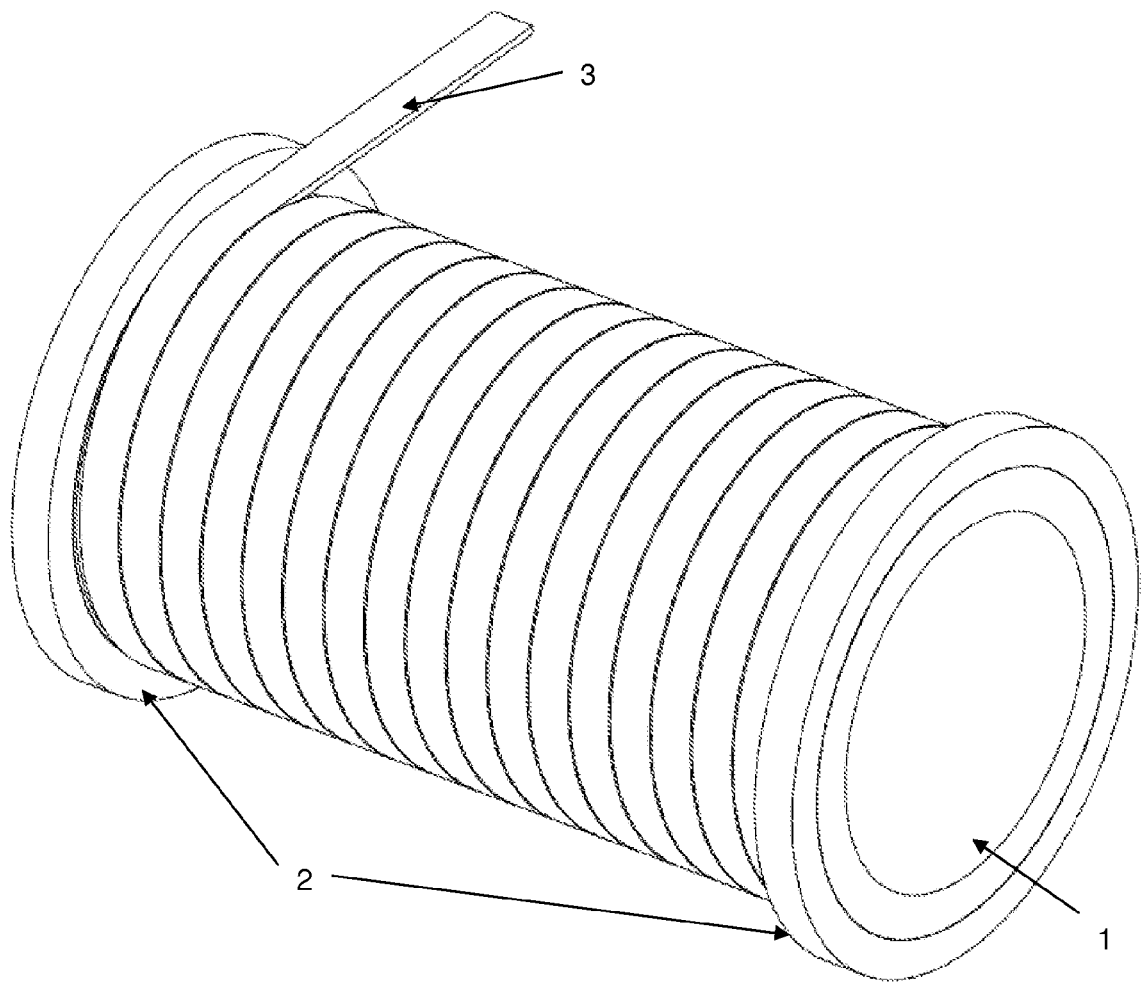
FIG. 1 shows a cylindrical liner, side rings and reinforcement bandage being wound on the liner.

In FIG. 1 a schematic direct winding process is demonstrated. A liner 1 has a pair of side rings 2 installed at the boundaries of the operational area of the liner. Inside the slot between the side rings a reinforcement bandage 3 is wound. Some adjustments for the liner would be necessary in order to enable application of a torque required for the specified pretension in the tow. The purpose of these modifications is to provide rigid connection with the winding machine. Since the task of providing a required connection is generally trivial, these adjustments are omitted on FIG. 1.

The choice of matrix material should be defined by required operational temperatures.

Figure 2:
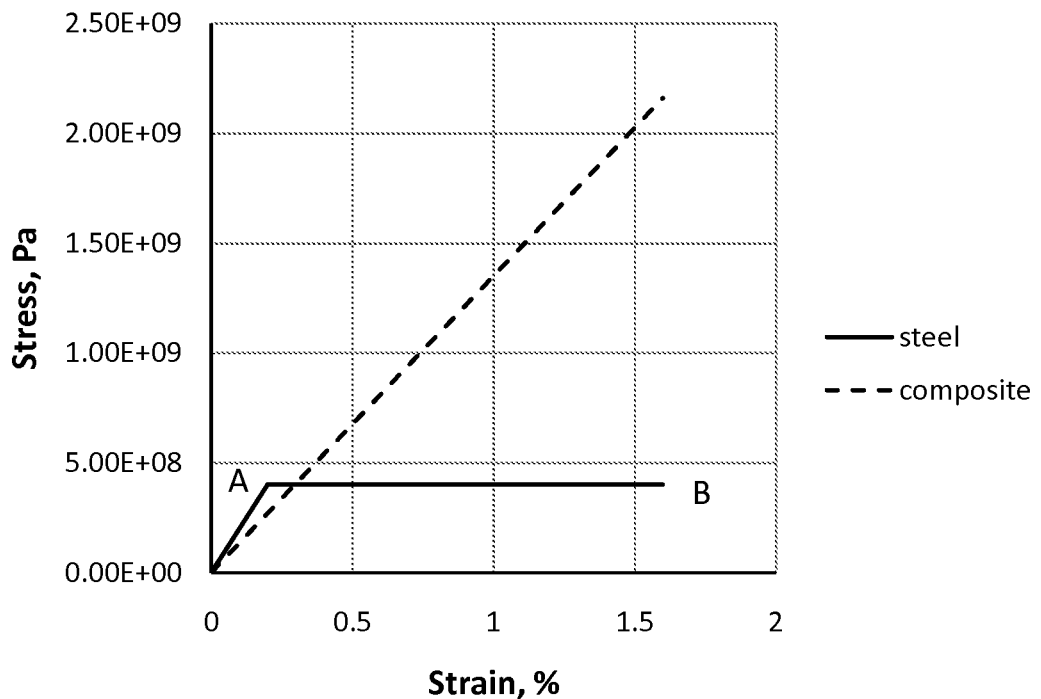
FIG. 2 shows mechanical characteristics of a typical 60% unidirectional carbon fiber composite and a typical steel grade.

In FIG. 2 mechanical characteristics of a typical steel grade and a typical carbon fiber composite with 60% fiber content are demonstrated. Modern unidirectional high-strength carbon fiber composites are capable of sustaining tension above 2 GPa. Ultra-high-strength carbon fiber composites can provide tensile strength even in excess of 3 GPa. However the stiffness of carbon fiber composites is typically lower compared to the stiffness of steel. The elastic domain of a typical steel is usually restricted by 0.2% strain. For a high-strength carbon fiber composite maximal elastic deformation typically exceeds 1.5%. Although there might be some deviation between different grades, it is obvious that there is a general mismatch between elastic domains of the steel and of the carbon fiber composites. If drawn steel wire is selected there would be a similar mismatch. The steel wire and conventional steel would share the same stiffness, but the steel wire has a substantially larger elastic deformation range due to much higher tensile strength.

In a well-balanced design both parts of the same component should have the same operational margin over applied load and fail simultaneously if this margin is exceeded. This means that the maximum strain in both parts should be achieved at the same load.

A simple example is presented in order to demonstrate some benefits of balancing the mechanical properties of the materials of the liner and reinforcement. A composite based on high strength carbon fiber can have operational strain of up to 1.2%. A steel liner would permit compressive strain of 0.15%, tensile strain of 0.07% depending on expected fatigue life and possible thermal strain of 0.1% corresponding to the expected operational temperature range. Normally compressive strength of the liner is neglected and the operational strain is then restricted only by the tensile strain and thermal expansion: 0.07+0.1=0.17%. If no pretension is applied to the reinforcement and only mechanical contact is provided between the liner and reinforcement, then the carbon fiber composite bandage would be loaded only up to 0.17/1.2*100%=14.2% of its operational strain, which makes this design unbalanced.

But if the liner can go from deep precompression of −0.15% into tension, the overall operational strain for the liner would increase up to 0.15+0.07+0.1=0.32%. In order to simplify calculations, it is assumed that this operational strain is shared by both the liner and reinforcement. In other words, it is assumed that both the liner and the reinforcement are thin compared to their diameter. Precompression in the liner can be achieved by applying corresponding pretension in the reinforcement. As the strain limit of the material of reinforcement may not be exceeded, the pretension level would be determined as 1.2−0.32=0.88%. The operational strain in the reinforcement would therefore vary from 0.88% to 1.2% and in the liner the strain would vary from −0.15% up to 0.17% including thermal expansion.

The operational strain of the liner could be defined as:

$$\varepsilon_\tau^l + \varepsilon_{therm}^l + \varepsilon_{comp}^l = \varepsilon_{max}^l,$$

where $\varepsilon_{comp}^l$ is precompression of the liner, $\varepsilon_\tau^l$ is the maximal tensile strain in the liner, $\varepsilon_{therm}^l$ is the maximal thermal expansion of the liner. The corresponding operational strain of the reinforcement could be determined as:

$$\varepsilon_{pretension}^r + \varepsilon_{max}^l = \varepsilon_{max}^r,$$

where $\varepsilon_{pretension}^r$ is the level of pretension introduced during manufacturing of the reinforcement.

Since both the liner and the reinforcement are assumed to be thin, a thin-shell approach would be applicable for designing the component. The goal of the design is to provide a component capable of sustaining the operational internal pressure $P_{oper}$. Thermal effects would currently be neglected.

Pressure applied by the reinforcement on the liner is determined by:

$$P_r = \frac{h_r}{R} \varepsilon_{pretension}^r E_r,$$

where $h_r$ is the thickness of reinforcement, R is the inner radius of reinforcement, $E_r$ is the stiffness of material of reinforcement.

This pressure is balanced by equivalent reaction of the liner. Since precompression of $\varepsilon_{comp}^l$ is expected in the liner:

$$P_l = \frac{h_l}{R} \varepsilon_{comp}^l E_l,$$

where $h_l$ is the thickness of liner, R is the outer radius of the liner, $E_l$ is the stiffness of material of the liner.

As these two pressures are equal, $$h_r = h_l \frac{\varepsilon_{comp}^l}{\varepsilon_{pretension}^r} \frac{E_l}{E_r}$$

When operational pressure $P_{oper}$ is applied, a tensile strain of $\varepsilon_\tau^l$ could be expected in the liner. So the total deformation of the liner would be $\varepsilon_\tau^l + \varepsilon_{comp}^l$. The relative deformation of the reinforcement would also be $\varepsilon_\tau^l + \varepsilon_{comp}^l$. Thermal strain is neglected at this stage. Therefore the applied operational pressure would be balanced by contributions of the liner and the reinforcement:

$$P_{oper} = \frac{h_l}{R}(\varepsilon_\tau^l + \varepsilon_{comp}^l)E_l + \frac{h_r}{R}(\varepsilon_\tau^l + \varepsilon_{comp}^l)E_r,$$

which after substitution of $h_r$ leads to:

$$P_{oper} = \frac{h_l}{R} E_l (\varepsilon_\tau^l + \varepsilon_{comp}^l)\left(1 + \frac{\varepsilon_{comp}^l}{\varepsilon_{pretension}^r}\right)$$

If no reinforcement and no precompression ($\varepsilon_{comp}^l = 0$) is used, the operational strain of the liner would be limited by the permissible tensile strain of the material of the liner. So the equivalent thickness of the liner would be proportionally larger:

$$P_{oper} = \frac{h_l^{eq}}{R} E_l \varepsilon_\tau^l$$

The ratio between thickness of the reinforced liner and thickness of the equivalent unreinforced liner could be determined as:

$$\frac{h_l}{h_l^{eq}} = \frac{(\varepsilon_\tau^l + \varepsilon_{comp}^l)\left(1 + \frac{\varepsilon_{comp}^l}{\varepsilon_{pretension}^r}\right)}{\varepsilon_\tau^l}$$

In the considered example this ratio would give 3.68. The reinforcement would also have a certain contribution into the overall weight of the component. If this contribution is included, the reinforced liner would be 3.5 times lighter.

This example clearly demonstrates advantages of introduction of pretension into the reinforcement and precompression into the liner. The pretension in the reinforcement could be obtained using one of two approaches. Each approach is described separately.

The high pretension winding procedure provides the highest mass reduction of the overall component. This is achieved through a complete use of mechanical properties of both material of the liner and material of the reinforcement. As was indicated above, some materials have considerably higher compressive strength compared to tensile strength. For instance, some ceramic materials show more than 10 times larger compressive strength compared to tensile strength. Some grades of cast iron also show substantially larger compressive strength compared to tensile strength. Despite fairly moderate tensile strength these materials have potentially large operational deformation range that could be employed if reinforcement is applied with sufficient pretension. In some cases tensile strength of the liner can even be neglected and the liner could be kept under compression at all operational loads. This would also make possible to split the liner into sectors which would be compressed against each other by the reinforcement.

Figure 4:
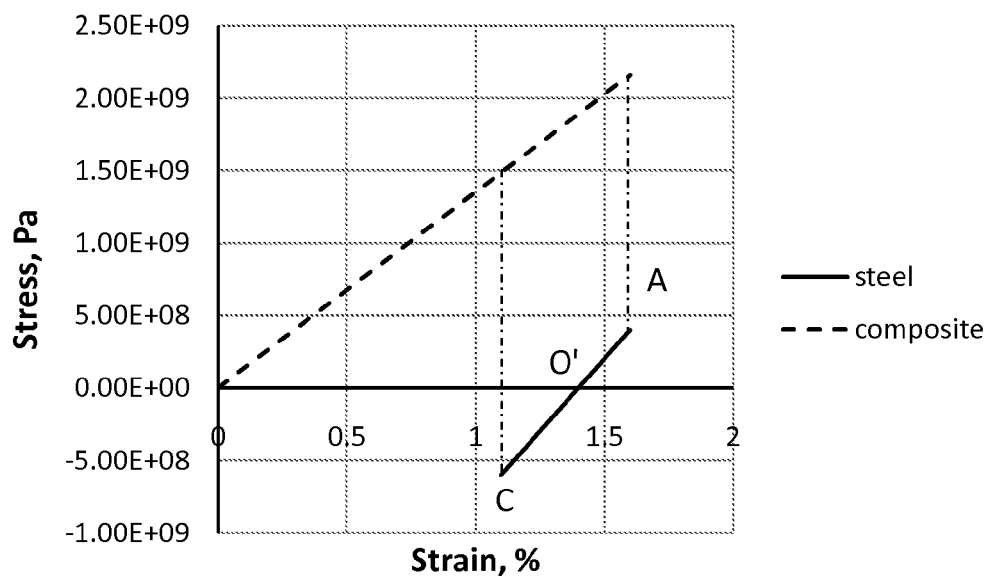
FIG. 4 shows mechanical characteristics of a typical 60% unidirectional carbon fiber composite subjected to pretension and a typical steel grade subjected to precompression.

The basic concept of winding with pretension is demonstrated in FIG. 4. Pretension in the reinforcement leads to precompression in the liner (point C in FIG. 4). This increases the operational strain of the liner from point C up to point A (FIG. 4) instead of from point O' to point A and provides a match of the maximal tensile strains of the reinforcement and the liner.

In addition to radial reinforcement, axial compression could be introduced by embedding high modulus axial reinforcement into the liner prior to performing winding with pretension. Axial compression would appear in the liner as a result of Poisson effect.

The liner can be made of a metal, or ceramics or another material and can constitute either a tube, or a full cylinder, or a closed array of sectors. The liner could also constitute a combination of different materials and shapes. For instance, the liner could be a rotor with permanent magnets or a flywheel carrier.

The winding with pretension comprises the following steps: fixation of the beginning of the composite tape or tow, winding under pretension and fixation of the composite tape or tow without loss of pretension. This means that pretension must be maintained throughout the whole process. Optionally, an external protection layer could be wound on top of the winding. Some additional tooling might be required in order to allow necessary torque. However this is generally trivial.

Figure 5:
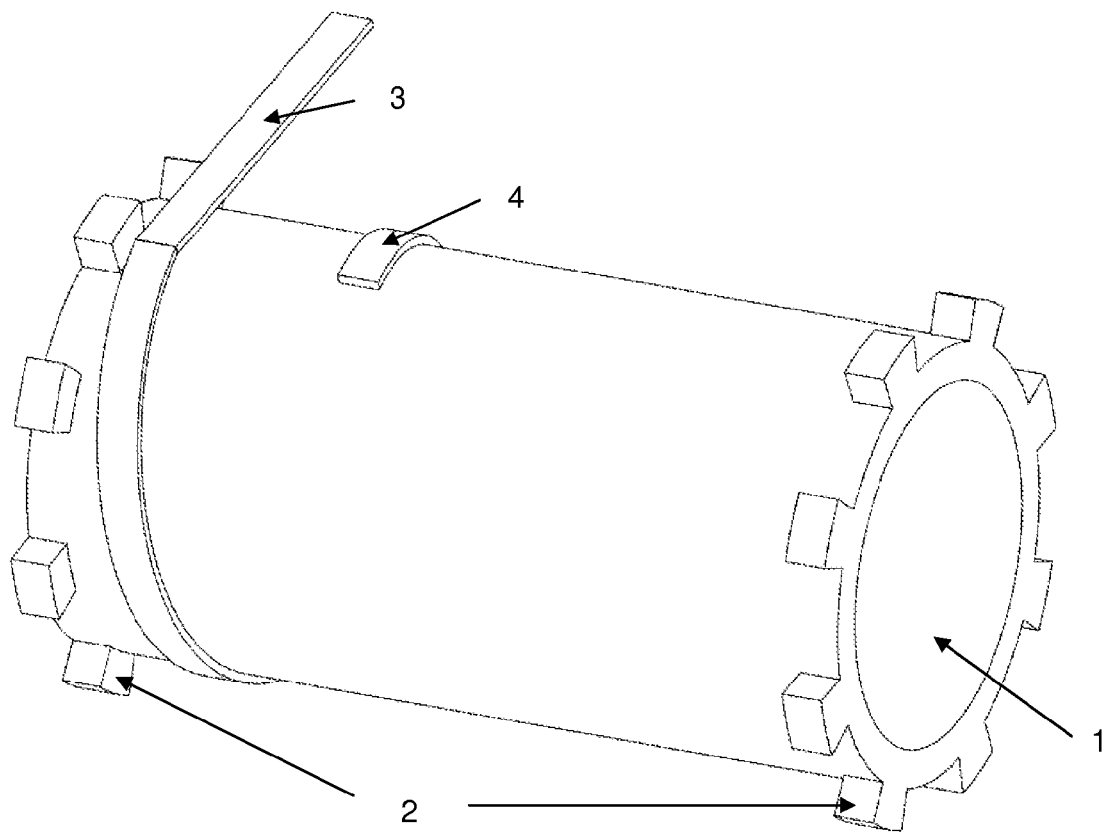
FIG. 5 shows a cylindrical liner with side elements and a preliminary winding being wound on the liner.

The last or the first turns of a layer can potentially fall off the side of the layer especially if the tape or tow or wire is not wide enough. In order to prevent this a side wall should be provided. This side wall could be obtained, for instance, by elements of the liner itself. In this case, depending on the material of the liner, it would be advisable to use a discontinuous side wall (FIG. 5) in order to maintain uniform radial stiffness of the liner along its length. If there is a continuous side wall, the radial stiffness would have a local increase, which could potentially lead to local failure of the material of the liner if a substantial contact pressure is applied on the operational surface of the liner. The side walls could also be provided by bolts or pins or inserts.

Side walls could also be provided by side rings. Side rings could either be premade rings or directly wound rings. However the common requirement for these rings would be that they must contain enough pretension or rather impose sufficient contact pressure to maintain a good grip with the liner under all operational conditions. It is preferable to achieve the same contact pressure between the side rings and the liner as between the main winding and the liner. In this case the liner would be subjected to a uniform compression along its operational length. Too high contact pressure of the side rings could cause excessive compression in the liner leading to its local failure, which should be avoided. However the contact pressure should also not be too low. During manufacturing of the main winding of the reinforcement bandage the liner would experience some shrinkage. So it is important that the side rings maintain the contact pressure with the liner despite deformation of the liner.

If premade side rings are installed on the liner, the radial interference fit must exceed the deformation of the liner due to contact pressure of the main winding of the reinforcement bandage.

Side rings could also be directly wound on the liner with a sufficiently wide tape or tow and with a sufficient pretension using any of the techniques described further in this invention. Such side rings will further be referred as prewound side rings.

Actually the reinforcement bandage could be manufactured as a set of individual rings wound under pretension next to each other. A winding routine would be fairly simple. Obviously, a set of premade rings could also be used in the same way. A disadvantage of this approach is that it would require more work with fixation of the end tapes of individual rings in case of directly wound rings or complex mounting operation in case of installation of premade rings. However this approach would also permit complex contact pressure profiles. A gun barrel is an example of an application where an axial gradient of contact pressure is usually required. Besides, the individual rings could be installed with an axial gap in between. This gap could be used for accessing the liner and for organizing efficient cooling.

Prewound side rings should preferably be manufactured in a similar way to the reinforcement bandage. The beginning of the composite tape should be fixed on the liner and pretension in the tape should be increased gradually during winding until it reaches the specified nominal value of pretension. The nominal value of pretension should be at least 10% of instantaneous tensile strength of the tape. The nominal pretension should be maintained in the winding and in the last turns the pretension should be decreased, as this would facilitate fixation of the composite tape or tow or wire. The minimal value of pretension depends on the application. In case of static applications where only internal pressure must be contained, the pretension in the last layers may be reduced down to zero, which would facilitate fixation of the composite tape or tow or wire. As a general rule, the pretension in the last turns should be reduced below 98% of the instantaneous tensile strength of the tape or tow. In case if the final component would be subjected to centrifugal loads, the pretension in the last layers may not go below the expected stress value due to the centrifugal load. Details of fixation of the composite tape or tow or wire are explained further. The tape or the tow must be sufficiently wide in order to give enough axial friction between the layers and thereby provide the axial stability of the ring. In order to improve the axial stability of the side rings, the winding could be performed with a tape having rough surface. Such a rough surface could be achieved by using a peel-ply during production of the tape. The peel-ply must be removed from the tape prior to winding. This would increase the friction between the layers. In order to further improve bonding strength between the layers of the side rings, a liquid bonding material could be applied between the layers. The liquid bonding material could be poured or applied with a brush. As an extra measure for securing the axial position of prewound side rings, they could be manufactured in corresponding slots on the liner. It would be safe to assume that the contact pressure between the completed ring and the liner should be in the range from 0.25% to 100% of the contact pressure of the completed reinforcement bandage after the winding of the reinforcement bandage. As an extra protection against possible mechanical damage an external layer could be optionally wound over the ring.

Fixation of the beginning of the tape or tow or wire is generally a trivial task. Below a few possible approaches are presented and in the actual application many alternative approaches for fixation could be found. However the proposed technique is not restricted to the presented fixation approaches. On the contrary, these approaches are shown only as examples in order to demonstrate the easiness and triviality of this operation.

Figure 6:
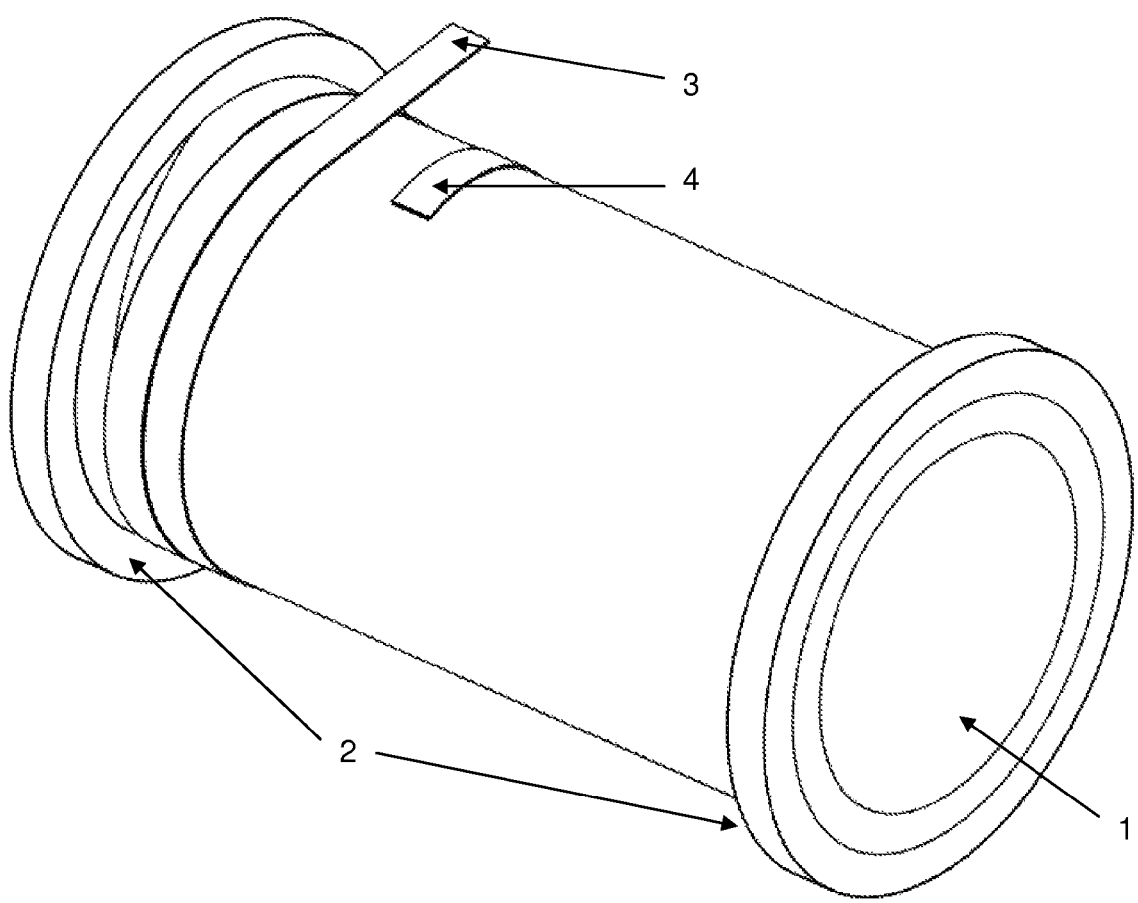
FIG. 6 shows a cylindrical liner, side rings and the main winding being wound over the preliminary winding.
Figure 7:
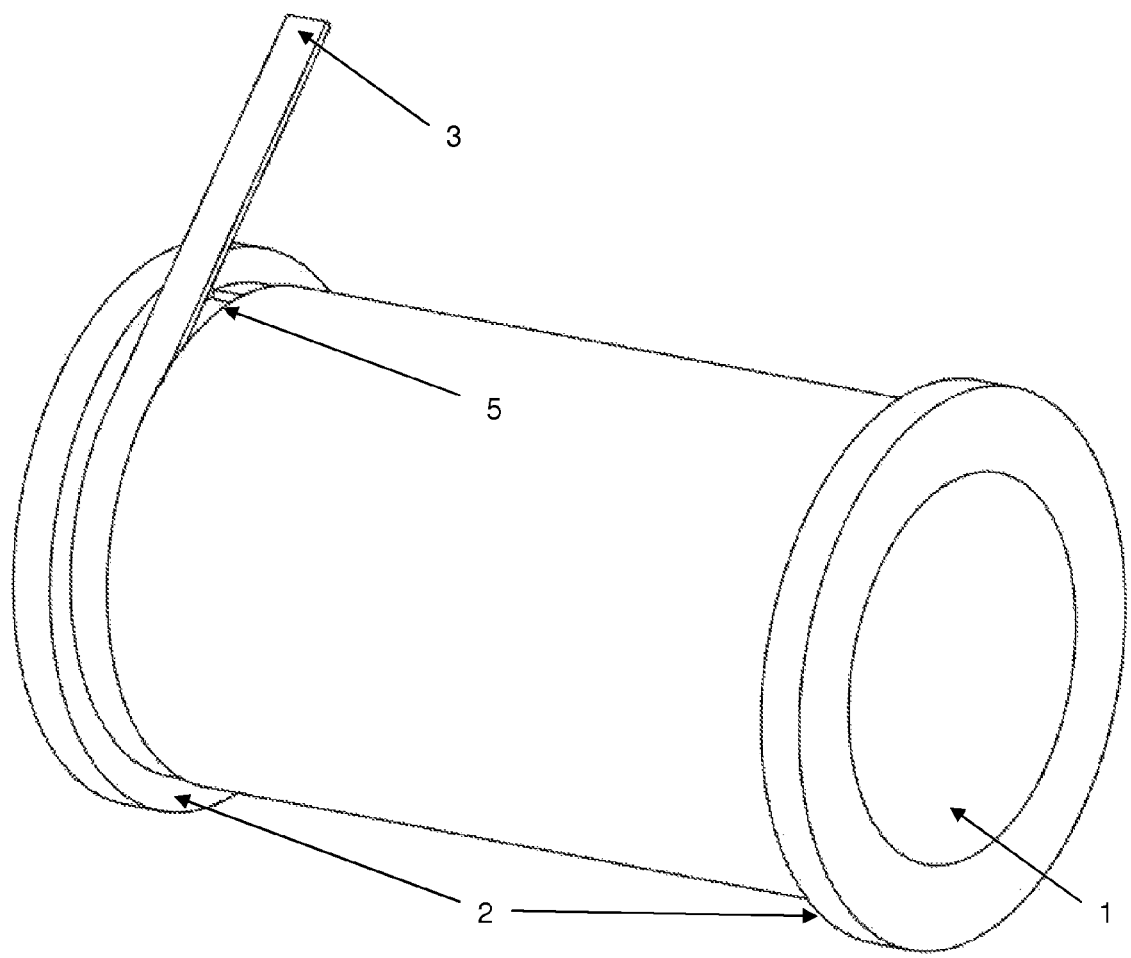
FIG. 7 shows a cylindrical liner with side elements and a preliminary winding being wound in a slot on the liner.

Fixation of the beginning of the fiber reinforced composite tape or tow with a thermoset matrix could be carried out using adhesive bonding, winding with a tape over itself, mechanical fixation with a mechanical clamping device or a combination of these approaches. Winding with a tape over itself is demonstrated in FIG. 5. The beginning of the tape 4 is fixed on the liner 1. After that a few turns of a preliminary winding are performed towards a side element on the liner 2. After the side element on the liner is reached, the main winding begins (FIG. 6). The main winding is wound over the preliminary winding. The applied pretension should gradually increase. When the tape is properly secured, the main winding could be interrupted and the part of the preliminary winding uncovered by turns of the main winding could be removed. It is also possible to use a slot 5 on the liner 1 (FIG. 7) in order to secure the beginning of the tape or tow or the wire. The tape or tow or wire is fixed in the slot on the operational area of the liner. The width of the slot should correspond to the width of the tape or tow or wire. After a few turns the pretension applied to the tape or tow or wire could start gradually increasing. When the slot is full and the diameter of the operational area is reached, the main winding could start.

The advantage of this approach is that irregularities on the surface of the winding due to preliminary turns could be prevented. The same types of fixation could be applied for composite tows with metal matrix and for metal wires.

If thermoplast matrix is used, the tape or tow could be welded with underneath layers by heating with a laser or another source of heat or a heating device. The heating should be above the melting temperature of the matrix material. So the heating in combination with contact pressure gives a solid connection via migration of molecules of the polymer through the contact surface. If the thermoplast matrix is melt, the load transfer between individual fibers becomes less efficient. So effect of defects in fibers would affect the strength of the tow. As state of the matrix affects the strength of the composite, the pretension has to be adjusted accordingly. The drop in strength is dependent on the type of the thermoplast polymer and should be determined experimentally. The pretension applied to the tow should be in the range from 1.5% to 98.5% of its instantaneous strength. In order to improve consolidation between layers a consolidation roller could be used in addition to the heating. The additional consolidation pressure applied through the roller would facilitate migration of molecules of the polymer through the contact surface and increase the strength of the bond between layers.

The main winding of the reinforcement bandage should be implemented in layers with the pretension being applied. The neighboring turns should preferably have an axial mechanical contact between each other or have a minimal gap determined by the position accuracy of the winding machine. The proposed technique does not specifically require the use of additional bonding between the layers of the main winding. However filling the space between layers is still permitted. This could be required for a number of reasons. For instance, if an improved radial thermal conductivity is expected of the reinforcement bandage or if additional radial sealing is needed. The type of liquid bonding material should be selected in accordance with the expected operational temperature of the component and can range from liquid polymers and glues up to liquid metals. The liquid bonding material could simply be poured on the liner or later on completed layers. Pouring the bonding material could be combined with the winding. It would be preferable that the bonding material remains liquid during winding as this would permit pushing the excessive material out of the bandage. So if a liquid metal is used as a bonding material, the temperature of the bandage during winding must be maintained above the melting temperature of the selected bonding material. In order to keep the bonding material within the bandage, the bandage must keep spinning even after completion of the main winding until the bonding material sufficiently cures or solidifies.

As the winding progresses, the liner would experience gradual increase in contact pressure and corresponding radial shrinkage. When radial shrinkage occurs the pretension in the already wound layers would be partially released. In order to compensate for this loss of pretension, the pretension in each layer of the winding should be determined as follows:

$$\varepsilon^r_{pretension,i} = \varepsilon^r_{pretension} + \varepsilon^l_{comp}\frac{N-i}{N},$$

where N is the total number of layers in the main winding of the reinforcement bandage;
i is the successive index of the current layer [1 ... N];

$\varepsilon^r_{pretension}$ is the target pretension in the reinforcement bandage;
$\varepsilon^l_{comp}$ is the target precompression in the liner.

The variation of pretension in successive layers presented above is provided for demonstration purposes only. For thin bandages it is usually linear. However the general rule is that extra pretension applied to the considered layer should correspond to the deformation of the liner that would occur due to the application of subsequent layers of the main winding of the reinforcement bandage. So the first layer would be wound with a pretension of $\varepsilon^r_{pretension}+\varepsilon^l_{comp}$ and the last layer would be wound with a pretension of $\varepsilon^r_{pretension}$. However when the main winding is complete, all the layers of the main winding of the reinforcement bandage would be subjected to the same pretension of $\varepsilon^r_{pretension}$. A possibility of providing a uniform pretension in all the layers of the reinforcement bandage is a unique feature and a clear advantage of the presented direct winding technique.

In order to facilitate fixation of the composite tape or tow or wire upon completion of the winding, the pretension in the last layer can be gradually reduced. If the final component is subjected only to the internal pressure, the pretension in the last turns of the main winding could be just a small fraction of the nominal pretension applied during winding, which would facilitate the fixation considerably. If the component would be subjected to centrifugal load, the pretension in the last turns should exceed the tensile stress due to the centrifugal forces. This is necessary in order to prevent detachment of last turns at the operational speed.

For instance, after completing the last layer with pretension $\varepsilon^r_{pretension}$, an extra layer could be added wherein the pretension would gradually drop from 100% down to 0.25-20% depending on conditions imposed by the application. Anyway it is advised to keep pretension in the last turns below 98% of the instantaneous tensile strength of the tape or tow or wire.

After the winding is completed, the tape should be properly fixed in order to maintain pretension. This can be implemented using a number of approaches. This task as such is fairly trivial. The presented approaches for fixation of the end tape or tow or wire are demonstrated as examples of how the problem of fixation could be handled. But it should not be concluded that the proposed manufacturing technique is restricted to the proposed approaches.

Depending on the selected approach fixation could be temporary or permanent. It could also be carried out either within the operational area of the liner, or on the side rings or side elements of the liner, or outside the operational area of the liner, or even outside the liner, for example, on additional tooling attached to the liner. The pretension in the tape or tow or wire prior to fixation is also dependent on the selected fixation approach.

It is possible to fix the tape using a mechanical clamping device. After the tape is fixed, the pretension could be released and the tape could be cut off. If application permits the presence of the mechanical clamping device and does not require any external protection, then nothing else should be done. Otherwise a local protection against unwinding can be implemented. This can be done by winding a ring over the winding close to the clamped part of the composite tape or tow or wire. This ring can be wound using a conventional sticking tape having suitable thermal limit, or a composite tape having rough inner and outer surface with simultaneous application of suitable bonding liquid between the layers. Alternatively, a thermoplast based composite tape could be used to provide the local protection from unwinding. The thermoplast matrix is supposed to be melted during winding. If high temperature is required for melting thermoplast that could be detrimental for the material of the bandage, then the first few layers of thermoplast could be wound without melting the thermoplast matrix. These first layers would provide thermal insulation preventing overheating and thermal damage of the lower layers of the bandage. Subsequent layers could be wound with application of heating for melting the thermoplast matrix and optionally pretension and/or contact pressure with a roller could be applied in order to achieve good consolidation of the layers of the thermoplast composite bandage.

After the local protection against unwinding is finished, the mechanical clamping device could be removed and the free end of the composite tape uncovered by the local protection against unwinding could be cut off.

In some applications, like, for instance, in gun barrels a certain gradient of contact pressure from reinforcement could be required. In order to satisfy this requirement the operational domain of the liner could be separated into sectors by a set of side rings. Winding in each sector could be carried out as described above.

Figure 8:
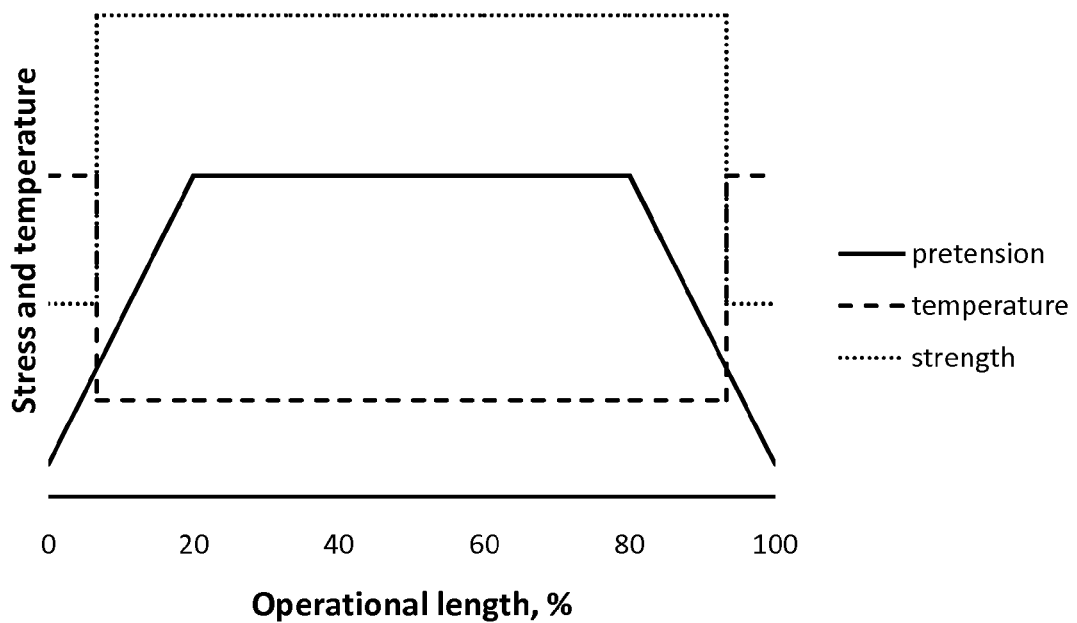
FIG. 8 shows a variation of pretension applied to the thermoplast composite tow, temperature of a heating element and tensile strength of the tow during winding a layer without side walls.
Figure 9:
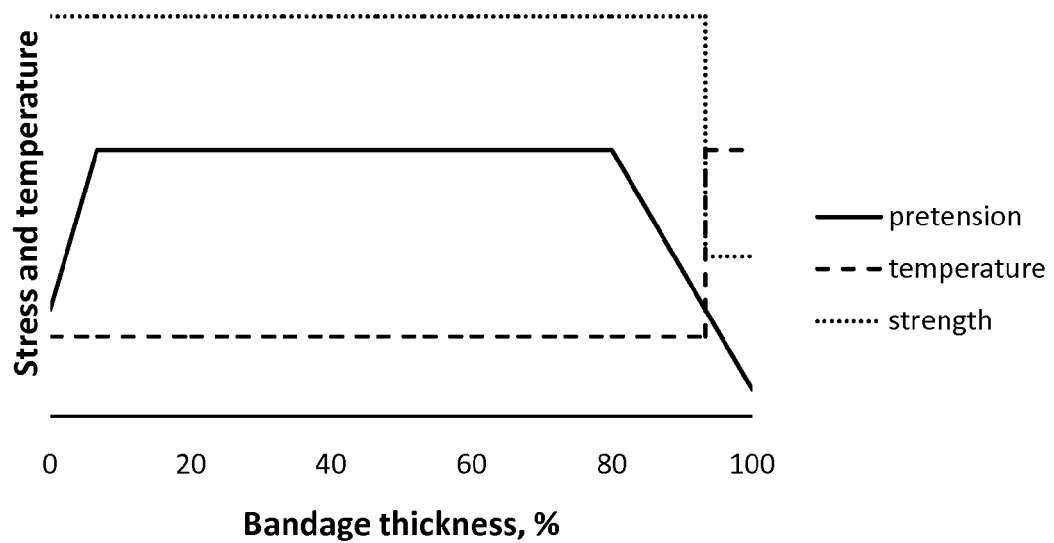
FIG. 9 shows a variation of pretension applied to the thermoplast composite tow, temperature of a heating element and tensile strength of the tow during winding a bandage with a few outermost consolidation layers.

If a thermoplast composite tow is selected as a material of reinforcement bandage, it could be handled in the exactly the same way as thermoset composite tape or tow or metal wire. However the use of thermoplast composite also offers some extra options which could increase flexibility of the manufacturing process and facilitate certain operations. For instance, with thermoplast composite tow thickness gradient could be more easily implemented through introduction of local fixation points by melting the matrix locally. A schematic variation of pretension applied to the tow as well as temperature of the heating element and tensile strength of the tow during winding of a layer is shown in FIG. 8. This layer is assumed to have no support on its sides by side rings or other side elements. Therefore in order to stabilize the side part of the layer local consolidation of the thermoplast composite could be implemented. Before reaching the end of the layer pretension applied to the tow must be reduced in order to prevent tow breakage during melting of the matrix, because, as was explained above, the strength of the tow would drop. When pretension level is safe, the tow can be heated with a heating element in order to melt the matrix. Then upon completion of the layer the winding direction could be reversed. After a few turns the heating element can be turned off and the pretension level could be gradually increased back to the nominal level. In order to assure good consolidation of the composite at the turning point an extra pressure could be provided on the tow with a roller. The process could be repeated the same way on the other side of the layer. The axial length of subsequent layers could decrease. Thereby a gradient of thickness of the reinforcement bandage could be achieved. In this example an axial gradient of pretension together with temperature were used for introduction of consolidation spots along the length of the main winding. The same approach could be used in the radial direction with the purpose of consolidating a few outermost layers and thereby provide protection for the bandage against unwinding and external damage. A schematic variation of pretension applied to the tow as well as temperature of the heating element and tensile strength of the tow during winding of the bandage through the bandage thickness is shown in FIG. 9. The pretension applied to the tow could be gradually reduced in successive layers until the pretension becomes smaller compared to the tensile strength of the tow with melted matrix. Of course, this reduction of pretension is supposed to be conducted in a limited number of steps for the sake of saving winding time and material. It is however advised to use at least one intermediate layer with a reduced pretension in order to get a thermal barrier between consolidation layers and internal layers of the bandage wound with high pretension. Then the heating element could be activated in order to melt the matrix and provide consolidation with the underneath layer. At least two consolidation layers are suggested. In order to improve consolidation quality a consolidation roller could be used.

In some applications an external protection, for instance, against possible external mechanical or environmental damage might be necessary for the reinforcement bandage. This protection could be implemented by winding an external layer. The external layer could also be used as a protection layer against unwinding. The tape or tow or wire has to be secured using a temporary fixation, like, for instance, a mechanical clamping device or a few layers of sticky tape with a suitable temperature range. The fixation should preferably be carried out outside the operational area of the liner.

After the main winding is completed, the liner would be in a predetermined compression $\epsilon_{comp}^l$. So the external layer is supposed to sustain operational temperature and the maximal operational strain of the liner as specified earlier:

$$\epsilon_\tau^l + \epsilon_{therm}^l + \epsilon_{comp}^l = \epsilon_{max}^l$$

The purpose of the external layer is to provide protection both from potentially aggressive environment and from unwinding. Therefore the external layer is required to maintain contact with the lower layers of the bandage in all the operational conditions.

Figure 10:
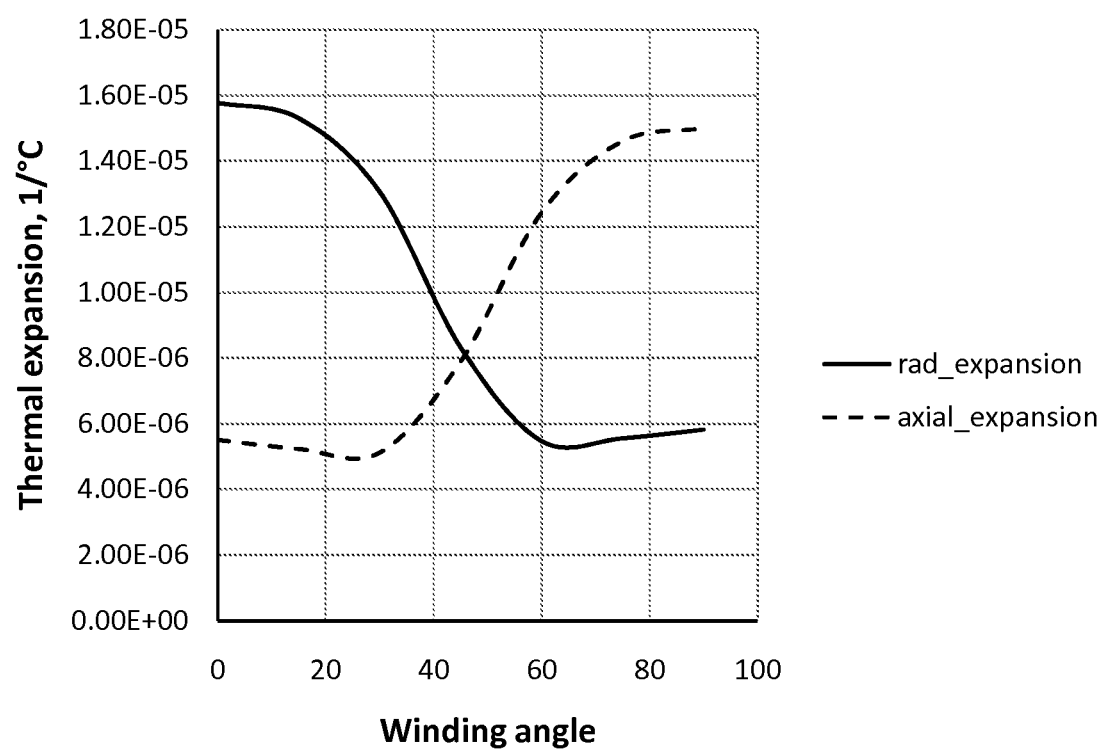
FIG. 10 shows a typical variation of radial and axial thermal expansion of a wound glass-fiber reinforced epoxy composite.

The operational strain of the liner in most cases would be acceptable even if high-modulus fibers are selected for the external layer. Another goal is to achieve radial thermal expansion in the external layer corresponding to the radial expansion of the liner with reinforcement. This correspondence could be provided by selecting an appropriate winding angle during manufacturing of the external layer. A typical variation of thermal expansion of a wound glass-fiber/epoxy composite in function of the winding angle is demonstrated in FIG. 10. If a carbon-fiber is used then the radial expansion could even become slightly negative at large winding angles. If radial mechanical contact should be maintained between the liner with reinforcement and the external layer, then the radial expansion of the external layer should be selected equal to the radial expansion of the liner with reinforcement or higher. In case of higher radial expansion of the external layer curing of the external layer could be carried out at elevated temperature. This would improve thermal performance of the polymer used in the external layer. When curing is finished the radial shrinkage of the external layer would exceed the radial shrinkage of the liner with reinforcement. Thereby the required radial mechanical contact between the external layer and the liner with reinforcement would be provided.

Either wet filament winding technique or winding with prepregs could be used. Another possible option is to use a few wraps of prepreg sheets having suitable fiber orientation. After curing the temporary fixation against unwinding could be removed.

Mechanical contact between the external layer and the liner with reinforcement could also be assured if the external layer is manufactured with pretension compensating for a possible incompatibility in thermal expansion. This can be implemented using prepreg tows with a thermoplast matrix as described earlier. The material of the thermoplast matrix should have a melting temperature corresponding to the expected operational temperature of the bandage. It is possible to use thermoplast matrix with higher melting temperature than necessary for the application. In that case an intermediate layer or a few layers would have to be wound with the thermoplast tow before starting consolidation layers by melting the thermoplast composite tow. This is required for insulating the external layers thermally from the rest of the bandage. The details of the winding process with a thermoplast composite tow have been described above.

Figure 11:
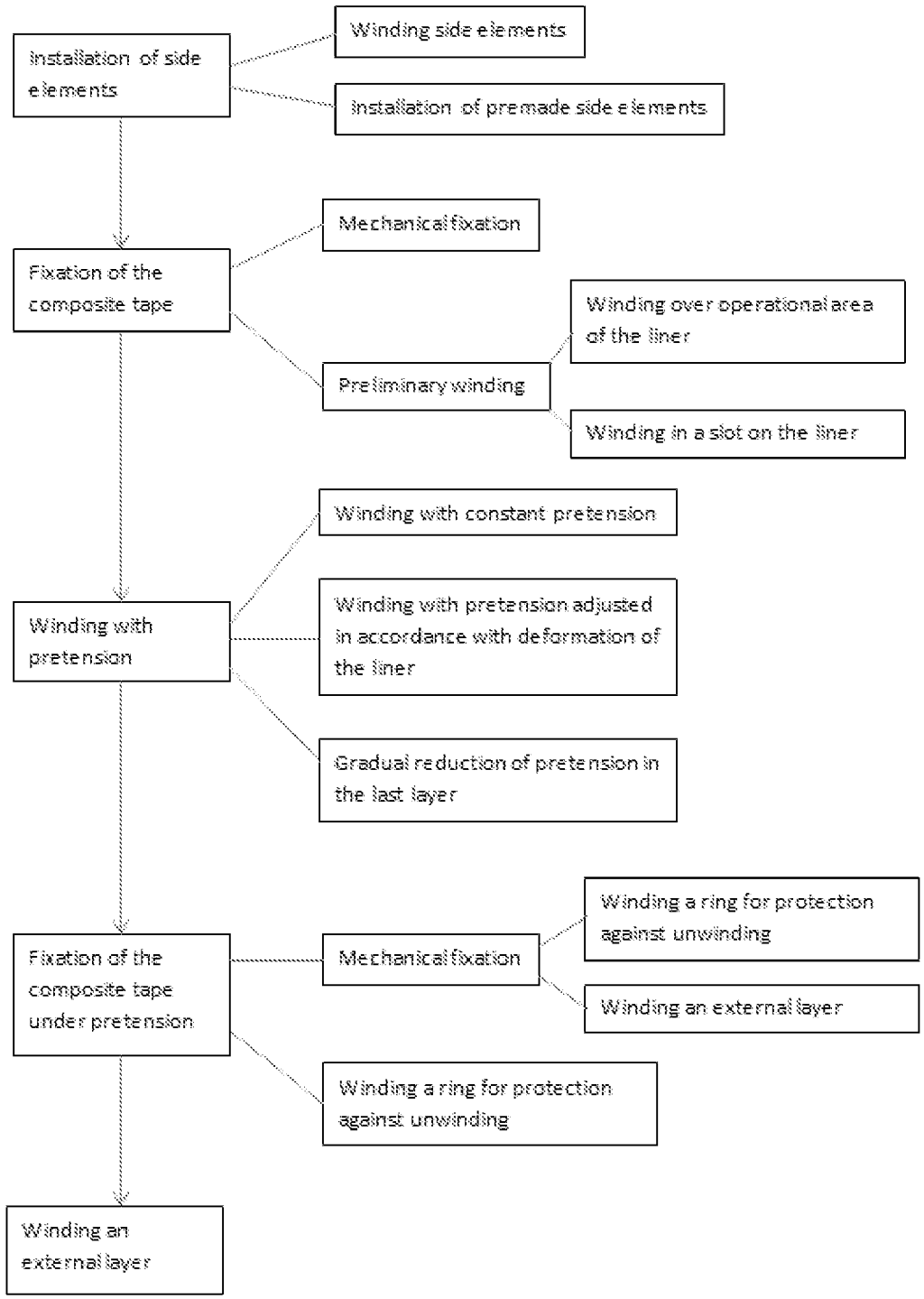
FIG. 11 shows a scheme of the winding procedure of a reinforcement bandage by a pultruded tow with cured thermoset matrix.

The basic manufacturing steps for winding under pretension with fully cured thermoset fiber-reinforced tow are shown in FIG. 11. The same steps would be generally applicable for a tow with metal matrix and for a metal wire.

Figure 12:
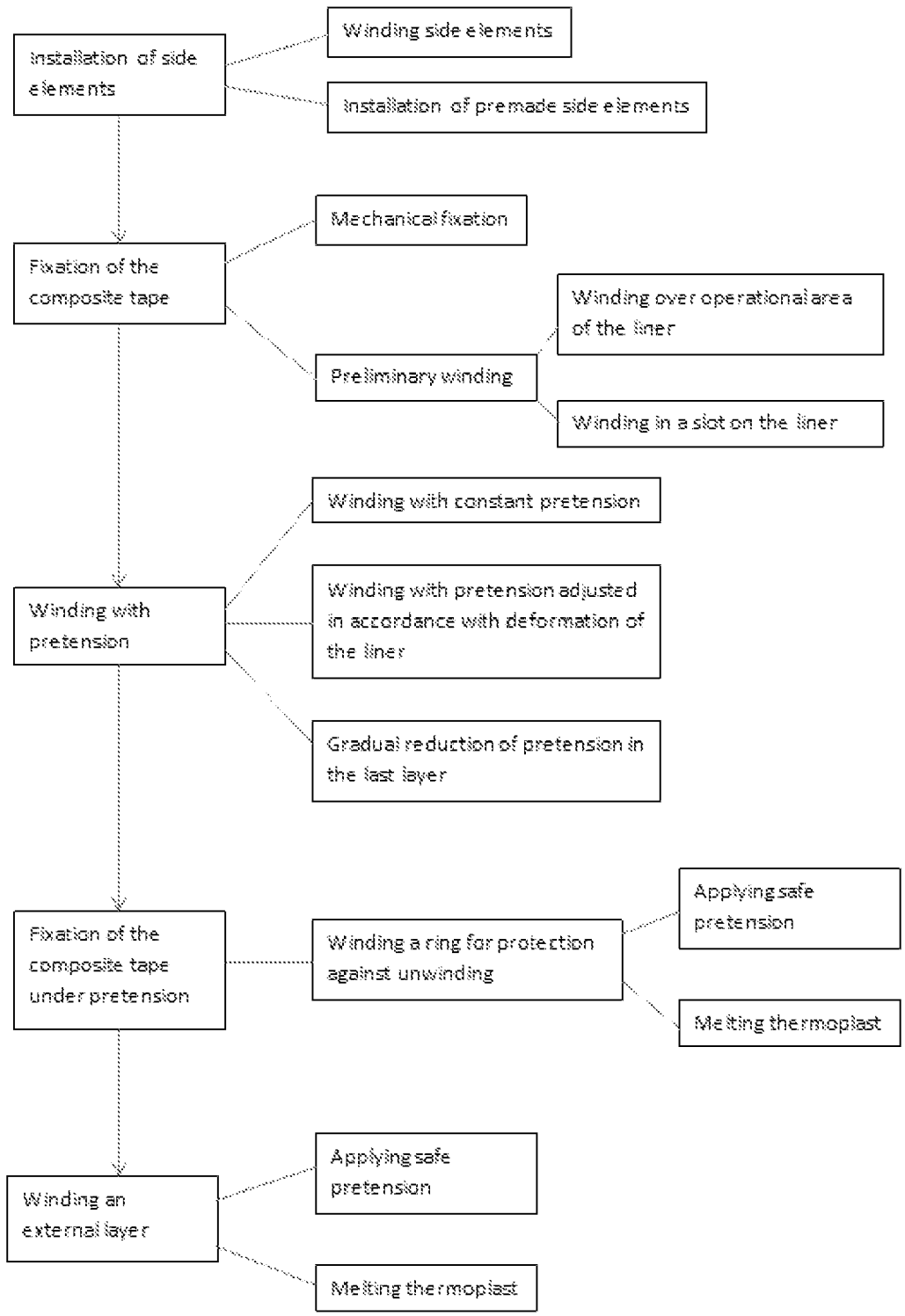
FIG. 12 shows a scheme of the winding procedure of a reinforcement bandage by a pultruded tow with thermoplast matrix.

The basic manufacturing steps for winding under pretension with thermoplast fiber-reinforced tow are shown in FIG. 12.

As explained above, winding with thermoplast fiber-reinforced tow could also be carried out according to the process defined for thermoset fiber-reinforced tows or metal wires. It is also possible to combine the two processes, by taking advantage of the benefits and easiness of winding with thermoplast fiber-reinforced tows for providing an external layer for reinforcement bandages manufactured using thermoset fiber-reinforced tows or metal wires.

Figure 3:
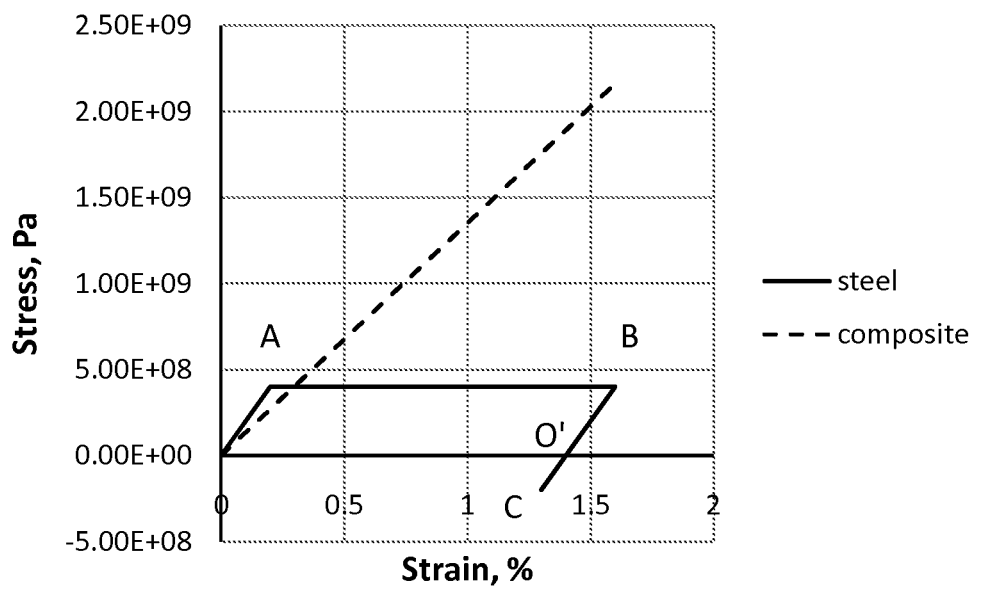
FIG. 3 shows mechanical characteristics of a typical 60% unidirectional carbon fiber composite and a typical steel grade subjected to plastic deformation.

An alternative to the direct winding under pretension is to introduce plastic deformation into the hollow metal liner by applying sufficient radial internal pressure (FIG. 3). It is implied here that the liner and the reinforcement bandage retain mechanical contact throughout the process. The overall deformation should not exceed the elastic limit of the reinforcement. After the internal pressure is released, the reference point for the liner would shift to larger deformation (O' instead of O). This would cause residual tension in the bandage and residual compression in the liner.

Figure 13:
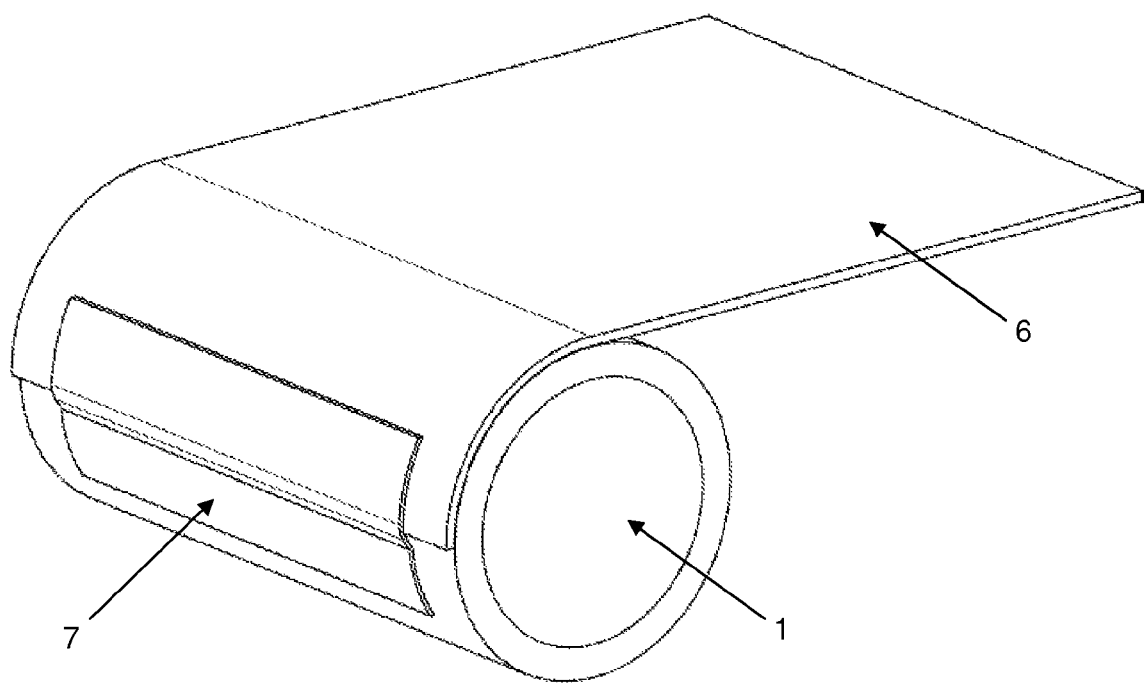
FIG. 13 shows a composite unidirectional carbon fiber reinforced sheet fixed on the liner.

This approach has a clear advantage, because it would be sufficient to maintain a mechanical contact between the liner and the bandage and no pretension would be required during manufacturing of the bandage. The direct winding procedure described earlier would still be applicable except that the high pretension would not be required. This would speed up the winding process considerably. In order to further simplify the winding process, it could be substituted by wrapping the liner over with a thin cured composite sheet, as shown in FIG. 13. The sheet 6 is fixed on the liner 1 by a piece of sticky tape 7. Depending on geometry of the component, either the sheet would be wrapped over the liner or the liner could be rolled into the sheet. A liquid thermoset polymer or a glue could be used for bonding the turns of the composite sheet together. The polymer or glue must have a suitable operational temperature range. Alternatively, if, for instance, a higher degree of flexibility is required from the sheet, a prepreg sheet with thermoset matrix could be used.

After the reinforcement is wound over the liner, an extra layer could be provided in order to prevent unwinding during application of the internal pressure to the liner. The extra layer would share the same deformation with the reinforcement. So it is advisable to use sufficiently elastic material in the extra layer that would also fit into the required operational temperature range.

After the reinforcement is properly secured from unwinding, radial internal pressure could be applied to the liner. The value of the required internal pressure is usually achievable with a conventional oil-pump. However the problem arises with containment of the pressurized liquid inside the liner, as large deformation of the liner would complicate the sealing. A substantial axial load emerging during this procedure would further complicate the process. Some manufacturers resolve these complexities by pushing a calibrated ball or a conical component through the cavity of the liner. Such a procedure is used for gun barrels. The process is complex and expensive.

A much easier and cheaper procedure could be provided with composites. For high radial internal load a special internal membrane is necessary that would have high axial strength, in order to contain the axial load, and have sufficient flexibility in the radial direction. Since composites typically have high mechanical anisotropy, these requirements could be satisfied by manufacturing a composite pressure vessel with a specified outer shape compatible with the cavity of the liner and containing only the axial layer. Typically pressure vessels have two types of layers, namely the axial layer for containing the axial load and the radial layer for containing the radial load. In this case the radial load would be contained by the liner with the reinforcement bandage. This special pressure vessel should have a sliding fit with the liner in order to permit its insertion. In some cases, like, for instance, in gun barrels, the applied radial load would have to have a certain axial gradient. This could be implemented by introducing a corresponding radial reinforcement on some parts of the internal composite pressure vessel where less radial load is required.

An external layer could be wound either prior or after deformation of the liner. Each approach would have its advantages. If the external layer is manufactured before the deformation of the liner, then there would be no problem with maintaining the contact between the external layer and the liner with reinforcement. However deformation of the liner would cause some residual pretension in the external layer potentially making it more vulnerable to external mechanical damage.

If the external layer is applied after the deformation of the liner, a correspondence in the radial thermal expansion would have to be provided. Details of this process were explained earlier.

The presented technology has considerable environmental benefits, as it allows fairly easy utilization of material of the reinforcing bandage. If no bonding polymer was used in the main winding, then it would be enough to remove the external layer or fixation against unwinding. Carbon fiber tapes or tows or metal wires of the main winding of reinforcement bandages could then be reused in another bandage or another similar application.

The invention claimed is:

1. A method of manufacturing a reinforcement bandage over a cylindrical liner with either a fully cured thermoset matrix fiber reinforced tape or tow, or a thermoplastic matrix fiber reinforced tape or tow, or a metal matrix fiber reinforced tape or tow, or a metal wire or with any combination of these tapes or tows or wires comprising the combination of steps:
   a) installation of side elements;
   b) fixation of a beginning of the tape or tow or wire;
   c) winding with the tape or tow or wire under pretension;
   d) gradually increasing the pretension in the tape or tow or wire up to at least 10% of its instantaneous tensile strength;
   e) reducing the pretension in last turns of the bandage below 98% of the instantaneous tensile strength of the tape or tow or wire;
   f) fixation of the tape or tow or wire while maintain the pretension upon completion of the winding;
   g) cutting off the tape or tow or wire.

2. The method of manufacturing a reinforcement bandage in accordance with the claim 1, wherein the liner is made of metal or ceramics and constitutes either a tube, or a full cylinder, or a closed array of sectors or constitutes a combination of different materials and shapes.

3. The method of manufacturing a reinforcement bandage in accordance with any one of the preceding claims, wherein the side elements are provided as elements of the liner or inserts installed on the liner.

4. The method of manufacturing a reinforcement bandage in accordance with the claim 1 or 2, wherein the side elements are provided by installation of premade rings with an interference fit exceeding the radial deformation of the liner due to the pressure of the reinforcement bandage and providing contact pressure that does not exceed the contact pressure of the reinforcement bandage.

5. The method of manufacturing a reinforcement bandage in accordance with the claim 1 or 2, wherein the side elements are provided as rings wound with a fiber reinforced tape or tow and either fully cured thermoset matrix or thermoplast matrix comprising the combination of steps:
   a) fixation of the tape or tow on the liner either in a corresponding slot on the liner or on a specified position on the liner;
   b) winding with the tape or tow on the liner with such a pretension that the contact pressure between a completed ring and the liner would be in a range from 0.25% to 100% of the contact pressure of the completed reinforcement bandage after the winding of the reinforcement bandage;
   c) reducing the pretension in last turns of the bandage below 98% of the instantaneous tensile strength of the tape or tow;
   d) fixation of the tape or tow without loss of pretension upon completion of the winding of the ring.

6. The method of manufacturing a reinforcement bandage in accordance with claim 1, wherein fixation of the beginning of the tape or tow or wire is provided using a mechanical clamping device.

7. The method of manufacturing a reinforcement bandage in accordance with claim 1, wherein fixation of the beginning of the tape or tow or wire is provided using a preliminary winding comprising the combination of steps:
   a) fixation of the tape or tow or wire in an operational area of the liner;
   b) winding towards a side ring or a side element on the liner;
   c) starting a main winding of the reinforcement bandage after the side ring or the side element on the liner is reached with gradual increase of an applied pretension;
   d) interrupting the main winding;
   e) removal of a part of the preliminary winding uncovered by turns of the main winding.

8. The method of manufacturing a reinforcement bandage in accordance with claim 7, wherein the preliminary winding is performed inside a slot in the liner comprising the combination of steps:
   a) fixation of the tape or tow or wire in the slot on an operational area of the liner;
   b) starting a main winding of the reinforcement bandage with a gradual increase of the applied pretension.

9. The method of manufacturing a reinforcement bandage in accordance with claim 1, wherein the winding is performed under pretension adjusted in accordance with deformation of the liner in such a way that upon completion of the winding all the layers of the reinforcement bandage would have a variation of pretension of less than 50%.

10. The method of manufacturing a reinforcement bandage in accordance with claim 1, wherein the tape or tow or wire is fixed upon completion of the winding using a mechanical clamping device.

11. The method of manufacturing a reinforcement bandage in accordance with claim 1, wherein the tape or tow or wire is fixed upon completion of the winding by a ring wound over the tape or tow or wire for protection against unwinding.

12. The method of manufacturing a reinforcement bandage in accordance with claim 1, wherein an external layer is wound over the reinforcement bandage.

13. The method of manufacturing a reinforcement bandage in accordance with the claim 12 wherein the winding angle in the external layer is adjusted in such a way that radial thermal expansion of the external layer either corresponds to or exceeds the radial thermal expansion of the liner with the reinforcement bandage.

14. The method of manufacturing a reinforcement bandage in accordance with claim 12, wherein the external layer is manufactured using a wet filament winding technique or utilizing prepregs.

15. The method of manufacturing a reinforcement bandage in accordance with claim 1, wherein the thermoplastic matrix fiber reinforced tape or tow is used for the winding and the fixation of the beginning of the tape or tow comprises the combination of steps:
   a) heating the tape or tow above a melting point of thermoplastic matrix with a heating device;
   b) applying the pretension in a range from 1.5% to 98.5% of the instantaneous tensile strength of the tow.

16. The method of manufacturing a reinforcement bandage in accordance with claim 1, wherein the side elements are comprised of thermoplast matrix fiber reinforced tape or tow and securing the side elements by winding comprises the combination of steps:
   a) gradually reducing the pretension in the tape or tow before approaching an end of a layer;
   b) heating the tape or tow above the melting point of the thermoplast matrix with a heating device after the pretension has reached a level below the tensile strength of the tape or tow with melted matrix;
   c) reaching the end of the layer and starting the next layer;
   d) gradually increasing the pretension in the tape or tow up to a nominal level;
   e) turning off the heating when pretension comes close to the strength of the tape or tow with melted matrix.

17. The method of manufacturing a reinforcement bandage in accordance with claim 1, wherein the thermoplast matrix fiber reinforced tape or tow is used for the winding and fixation of the tow upon completion of the winding comprises the combination of steps:
   a) reducing the pretension in the tape or tow below the tensile strength of the tape or tow with melted matrix;
   b) winding at least one layer with a reduced pretension;
   c) heating the tape or tow above the melting point of thermoplast matrix with a heating device;
   d) winding at least one layer with applied heating;
   e) cutting off the tape or tow.

18. The method of manufacturing a reinforcement bandage in accordance with claim 1, wherein hollow cylindrical liner is made of metal and winding with the tape or tow or wire is performed with pretension sufficient for maintaining mechanical contact between the reinforcement bandage and the liner upon completion of the winding, comprising an additional manufacturing step of applying radial internal pressure to the liner with reinforcement bandage using an internal composite pressure vessel, having only an axial reinforcement.

19. The method of manufacturing a reinforcement bandage in accordance with the claim 18 wherein the internal composite pressure vessel has some areas along its length containing radial reinforcement.

20. The method of manufacturing a reinforcement bandage in accordance with the claim 18 wherein an external layer is wound over the reinforcement bandage after plastic deformation of the liner.

21. The method of manufacturing a reinforcement bandage in accordance with claim 18, wherein the reinforcement bandage is manufactured by wrapping a fiber reinforced sheet with thermoset, thermoplast or metal matrix over the liner.

22. The method of manufacturing a reinforcement bandage in accordance with claim 1, wherein liquid bonding material is poured on the bandage during winding.

23. The method of manufacturing a reinforcement bandage in accordance with the claim 5, wherein liquid bonding material is poured on the ring during winding.

24. The method of manufacturing a reinforcement bandage in accordance with claim 5, wherein an external layer is wound over the ring.

25. The method of manufacturing a reinforcement bandage in accordance with claim 17, wherein an additional consolidation pressure is applied during winding on the tape or tow with melted thermoplast matrix.

26. The method of manufacturing a reinforcement bandage in accordance with claim 18, wherein an external layer is wound before application of the internal pressure to the liner.

27. The method of manufacturing a reinforcement bandage in accordance with claim 18, wherein liquid bonding material is introduced into the reinforcement bandage during winding.

* * * * *